(12) United States Patent
Benson

(10) Patent No.: US 6,412,135 B1
(45) Date of Patent: Jul. 2, 2002

(54) EXCHANGER OF WALL CLEARING SHUTTLES

(76) Inventor: Robert A. Benson, 20 Rowes Wharf, Boston, MA (US) 02110

( * ) Notice: Subject to any disclaimer, the term of this patent is extended or adjusted under 35 U.S.C. 154(b) by 0 days.

(21) Appl. No.: 09/813,528

(22) Filed: Mar. 21, 2001

(51) Int. Cl.[7] .................................................. B08B 9/04
(52) U.S. Cl. ................... 15/104.062; 15/3.51
(58) Field of Search ................................ 210/194, 407, 210/413, 354, 355; 62/71, 342; 165/94; 15/3.5, 3.51, 104.061, 104.062

(56) References Cited

U.S. PATENT DOCUMENTS 3,116,503 A * 1/1964 Bagwell
3,158,888 A * 12/1964 Ericson
5,427,680 A    6/1995 Benson
6,070,417 A    6/2000 Benson

* cited by examiner

*Primary Examiner*—Joseph W. Drodge
*Assistant Examiner*—Terry K. Cecil
(74) *Attorney, Agent, or Firm*—Maura K. Moran

(57) ABSTRACT

A shuttle exchanger 22 exchanges a shuttle 19 circulating in a reentrant lumen 13 by actuating a channel selector 27 to alter the path of the shuttle to be exchanged. Following the altered path the to-be-exchanged shuttle impinges on a shuttle 42 stored in a storage channel 25 and drives it into the reentrant loop while the to-be-exchanged shuttle is retained in the storage channel. The enclosing wall 23 of the shuttle exchanger defines part of the reentrant lumen and includes therein the channel selector 27, the shuttle storage channel 25, a bypass channel 26, and a collector section 29.

2 Claims, 2 Drawing Sheets

EXCHANGER OF WALL CLEARING SHUTTLES

BRIEF SUMMARY OF THE INVENTION

Machines for processing material such as are described in U.S. Pat. Nos. 5,427,680 and 6,070,417 process material at the wall of a reentrant lumen and employ a wall-clearing shuttle which recirculates through the lumen to clear from the lumen wall material which deposits thereon. The present invention effects replacement of a shuttle being used in such a machine with a different shuttle without interruption of the processing by diverting an operating shuttle from its normal channel to a replacement channel where it is exchanged for a new shuttle which then circulates around the lumen.

DETAILED DESCRIPTION

Figure 1:
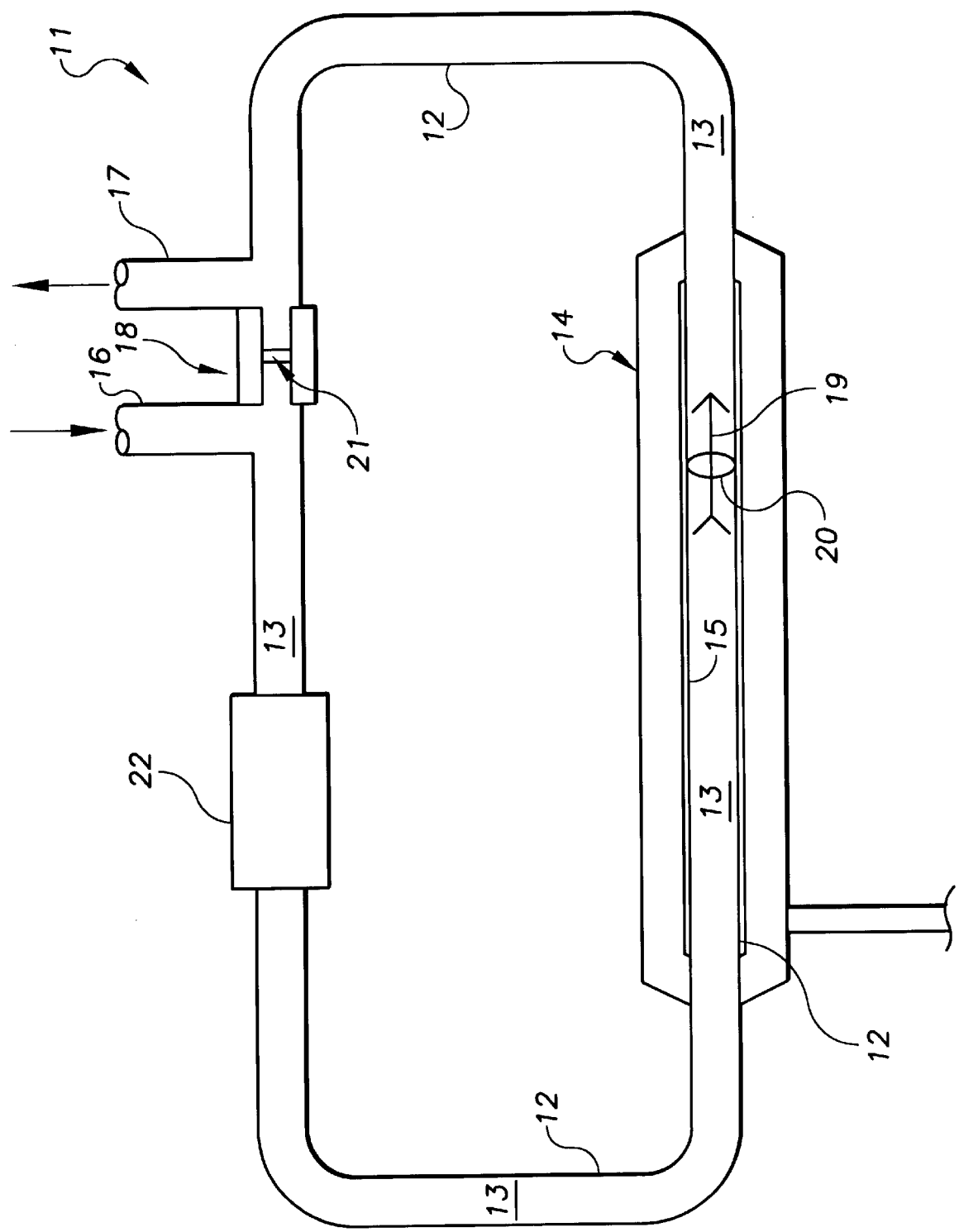
FIG. 1 shows a material processing machine including an exchanger of wall clearing shuttles according to the invention.

Machine for processing material 11, according to the invention includes lumen defining structure 12 which defines a continuous reentrant lumen 13 having an entrance port 16 providing an inlet to the lumen and an exit port 17 providing an outlet from the lumen. Processing section 14 and shuttle return structure 18 occupy parts of the lumen. Processing section 14 includes processing wall 15, which is part of the wall of the lumen. It is contemplated that the invention may be employed in any process where material accumulates on a processing wall. Examples are a porous processing wall on which filter cake accumulates during filtering through the wall or a heat exchanger wall on which material freezes out on cooling.

Wall-conditioning shuttle 19 is situated within and is free to move along the lumen. and includes a wall conditioning element 20 which clears accumulated material from processing wall 15 as the shuttle passes through the processing section. Shuttle return structure 18 includes a mechanism 21 permitting passing of a shuttle from the exit port to the entrance port through the return structure while blocking flow of fluid from the entrance port to the exit port.

Figure 2:
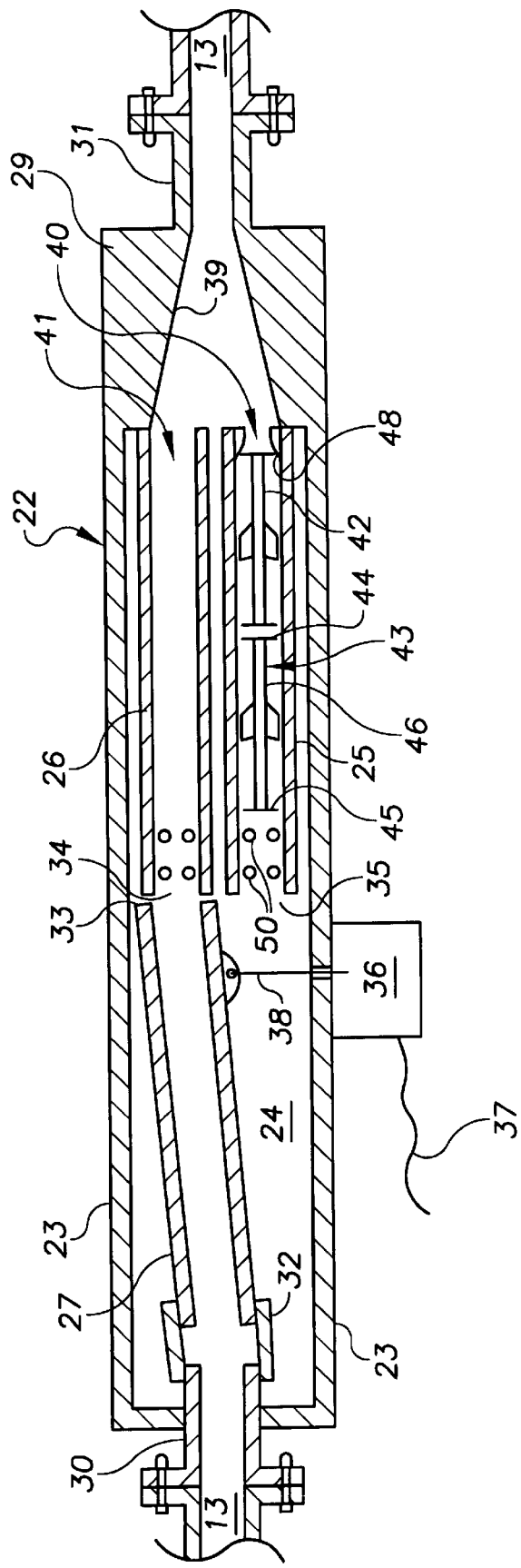
FIG. 2 shows in greater detail and in cross-section view the shuttle exchanger of FIG. 1.

Shuttle exchanger 22, shown particularly in FIG. 2, has an inlet 30 connected to an upstream portion of lumen 13 and an outlet 31 connected to a downstream portion of lumen 13 and is included in the circuit of the lumen. Exchanger 22 has enclosing wall 23 providing a chamber 24 which encloses storage channel 25, bypass channel 26, channel selector 27, and collector section 29.

Channel selector 27 is joined to exchanger inlet 30 by a flexible element 32 permitting channel selector to be moved to either a position with its free end 33 opposed to the entrance 34 of bypass channel 26 (as is shown in FIG. 2) or to a position with its free end opposed to entrance 35 of storage channel 25. Control mechanism 36 controls the position of channel selector through linkage 38 in accordance with signals received on communication link 37. Collector section has a converging interior face 39 with its larger opening opposing both the exit 40 of storage channel 25 and the exit 41 of bypass channel 26. The converging portion of the collector section is advantageously made shorter than the length of a shuttle.

First shuttle 42 is positioned in the forward portion of storage channel 25 and second shuttle 43 is positioned behind it in the rearward portion of storage channel 25.

Shuttle 43 has an elongated form with lead entrainment element 44, rear entrainment element 45, and wall conditioning element 20 all affixed on flexible spine 46 running the length of the shuttle. The construction of the shuttle is shown in further detail in U.S. Pat. No. 5,427,680. Shuttles 42 and 19 have the same construction as shuttle 43.

A narrowing at the front end of storage channel 25 impedes but does not prevent the movement of a shuttle out of the storage channel. The narrowing could be in the form of a detenting structure. In this embodiment, it is shown as a constriction 48. Holes 50 near the entrance of the storage channel provide a vent permitting fluid to flow out of the rearward portion of the storage channel.

The operation of the processing machine is as follows. A feed stock fluid flows into entrance port 16 and thence flows around the lumen, passing through shuttle exchanger and processing wall 15 and out through exit port 17 while the blocking mechanism prevents flow across return structure from the entrance port to the exit port. As this fluid passes through the processing wall it undergoes some processing which results in accumulation of material on the processing wall. At the same time the shuttle 19 is swept around the lumen by the flowing fluid and as it passes through the processing wall it clears the accumulated material from the wall. When the shuttle is swept into the return structure it is advanced through the return structure to the vicinity of the entrance port and again circles the loop of the lumen.

During the operation as just described, the channel selector of the shuttle exchanger is positioned with its end opposite the entrance of the bypass channel. (This is the position illustrated in FIG. 2.) With the channel selector in this position fluid flows freely from the inlet of the shuttle exchanger through the channel selector, then the bypass channel, and the collector section to the outlet of the exchanger. A shuttle is swept along the same path.

If at some point it becomes desirable to change an operating shuttle for another because it has become worn or for any other reason, a signal is sent to the control mechanism 36 over communication link 37 to effect the exchange of shuttles. The control mechanism moves the channel selector 27 downward (as illustrated) to place its end opposite the entrance to the storage channel 25. Then the next time a shuttle enters the shuttle exchanger it will be directed by the channel selector to the storage channel where it will bump into the rear of the chain of stored shuttles. The impact of the arriving shuttle will drive the foremost stored shuttle past the constriction 48 and into the collector section whence it will be guided into the outlet of the exchanger and continue around the lumen. The old shuttle will be pushed into the storage channel until it uncovers the vent, at which point the flow will take its course through the vent to the bypass channel and stop driving the old shuttle forward.

At this point the new shuttle will be passing around the lumen and the old shuttle will be resting at the back of the line of stored shuttles. The control mechanism will then move the channel selector to the bypass position and the new shuttle will circulate around the shuttle as before described.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A machine for processing material comprising lumen-defining structure defining a continuous reentrant lumen, said lumen-defining structure including a section with a processing wall and a shuttle return structure, an entrance port providing an inlet to said lumen and an exit port providing an outlet from said lumen, said entrance port and said exit port being positioned along the lumen so that the return structure is between them, and a wall-conditioning shuttle situated within and free to move along the lumen, and including a wall conditioning element effective when said shuttle passes through a part of said lumen bounded by said processing wall to clear accumulated material from said processing wall, said return structure including mechanism which permits passage of a shuttle from said exit port to said entrance port through said return structure while blocking flow of fluid from the entrance port to the exit port through said return structure, said machine further comprising a shuttle exchanger comprising an enclosing wall which is part of said lumen-defining structure and provides a chamber with an inlet connected to an upstream portion of said reentrant lumen and an outlet connected to a downstream portion of said reentrant lumen, a storage channel having an entrance and an exit, a bypass channel having an entrance and an exit, a channel selector, a collector section, a vent, a control mechanism controlling the position of the channel selector, and a shuttle stored in said storage channel, wherein said storage channel, said bypass channel, said channel selector and said vent lie within said enclosing wall, wherein said channel selector is constructed and positioned so as to receive a shuttle entering said shuttle exchanger and direct it to the entrance of either said bypass channel or said storage channel in accordance with a setting of said control mechanism, wherein said collector section is constructed and positioned to receive a shuttle emitted from either the exit of the storage channel or the exit of the bypass channel and guide the emitted shuttle into the outlet of said shuttle exchanger, wherein said vent is constructed to permit fluid to flow from said channel selector into said collector section while said channel selector is positioned to direct a shuttle into the entrance of said storage channel.

2. An exchanger of wall clearing shuttles in a reentrant lumen with a processing wall comprising an enclosing wall which forms part of the boundary of said reentrant lumen and provides a chamber with an inlet connected to an upstream portion of said reentrant lumen and an outlet connected to a downstream portion of said reentrant lumen, a storage channel having an entrance and an exit, one or more shuttles, a bypass channel having an entrance and an exit, a channel selector, a collector section, a vent, and a control mechanism controlling the position of the channel selector, wherein said storage channel, said bypass channel, said channel selector and said vent lie within said enclosing wall, wherein said channel selector is constructed and positioned so as to receive a shuttle entering said shuttle exchanger and direct it into the entrance of either said bypass channel or said storage channel in accordance with a setting of said control mechanism, wherein said collector section is constructed and positioned to receive a shuttle emitted from either the exit of the storage channel or the exit of the bypass channel and guide the emitted shuttle into the outlet of said shuttle exchanger, wherein said vent is constructed to permit fluid to flow from said channel selector to said collector section while said channel selector is positioned to direct a shuttle to the entrance of said storage channel, and said one or more shuttles are stored within said storage channel.

* * * * *